(12) United States Patent
McIntyre et al.

(10) Patent No.: US 7,536,240 B2
(45) Date of Patent: May 19, 2009

(54) REAL POWER REGULATION FOR THE UTILITY POWER GRID VIA RESPONSIVE LOADS

(75) Inventors: Timothy J. McIntyre, Knoxville, TN (US); Brendan J. Kirby, Knoxville, TN (US); Roger A. Kisner, Knoxville, TN (US); James W. Van Dyke, Knoxville, TN (US)

(73) Assignee: UT-Battelle, LLC, Oak Ridge, TN (US)

( * ) Notice: Subject to any disclaimer, the term of this patent is extended or adjusted under 35 U.S.C. 154(b) by 313 days.

(21) Appl. No.: 11/459,095

(22) Filed: Jul. 21, 2006

(65) Prior Publication Data

US 2007/0038335 A1  Feb. 15, 2007

Related U.S. Application Data

(60) Provisional application No. 60/701,746, filed on Jul. 22, 2005.

(51) Int. Cl.
*G05D 11/00* (2006.01)
(52) U.S. Cl. .................................... 700/286
(58) Field of Classification Search ................. 323/234, 323/266, 299; 700/286, 291, 292, 295–297; 702/57, 60, 79; 705/1, 412
See application file for complete search history.

(56) References Cited

U.S. PATENT DOCUMENTS

| | | | |
|---|---|---|---|
| 6,122,603 A | 9/2000 | Budike, Jr. | |
| 6,311,105 B1 | 10/2001 | Budike, Jr. | |
| 6,785,592 B1 * | 8/2004 | Smith et al. | 700/291 |
| 7,409,303 B2 * | 8/2008 | Yeo et al. | 702/60 |
| 2004/0145932 A1 | 7/2004 | Skeist et al. | |
| 2004/0249775 A1 | 12/2004 | Chen | |
| 2004/0257858 A1 | 12/2004 | Mansingh et al. | |
| 2004/0260430 A1 | 12/2004 | Mansingh et al. | |
| 2004/0260489 A1 | 12/2004 | Mansingh et al. | |

OTHER PUBLICATIONS

Emilia Noble; Anjan Bose; Kevin Tomsovic; Bilateral Market for Load Following Ancillary Services; School of Electric Engineering and Computer Science, Washington State University, Pullman, WA. 99164 USA; 0-7803-6423-6/00$10.00 (c) 2000 IEEE, 3 pages.

Jason Black; Integrating Demand into the U.S. Electric Power System; Technical, Economic and Regulatory Frameworks for Responsive Load; Submitted to the Engineering Systems Division in Partial Fulfillment of the Requirements for the Degree of Doctor of Philosophy in Engineering Systems at the Massachusetts Institute of Technology; Jun. 2005; 26 pages.

* cited by examiner

*Primary Examiner*—Matthew V Nguyen
(74) *Attorney, Agent, or Firm*—Luedeka, Neely & Graham, P.C.

(57) ABSTRACT

A system for dynamically managing an electrical power system that determines measures of performance and control criteria for the electric power system, collects at least one automatic generation control (AGC) input parameter to at least one AGC module and at least one automatic load control (ALC) input parameter to at least one ALC module, calculates AGC control signals and loads as resources (LAR) control signals in response to said measures of performance and control criteria, propagates AGC control signals to power generating units in response to control logic in AGC modules, and propagates LAR control signals to at least one LAR in response to control logic in ALC modules.

14 Claims, 10 Drawing Sheets

# REAL POWER REGULATION FOR THE UTILITY POWER GRID VIA RESPONSIVE LOADS

CROSS-REFERENCE TO RELATED APPLICATIONS

This application claims priority to U.S. Provisional Patent Application 60/701,746 filed Jul. 22, 2005, and is herein incorporated by reference.

STATEMENT REGARDING FEDERALLY SPONSORED RESEARCH

This invention was made with United States Government support under Contract No. DE-AC05-00OR22725 between the United States Department of Energy and U.T. Battelle, LLC. The United States Government has certain rights in this invention.

BACKGROUND OF THE INVENTION

Utility power systems are required to balance power generation with load continuously. This balancing in the time horizon of one to ten minutes, referred to as regulation, is currently achieved through the control of power generators that are capable of modifying their output in response to varying load demand. The state of the art is generators chasing loads. Generators are slow to move and inaccurate in their response to control signals. In contrast, some loads are very fast responding and accurate as well as environmentally and economically more efficient to provide the services of regulation as well as spinning reserve. Thus, there is a need for a control system that uses a responsive load to provide regulation or spinning reserve to the power grid.

BRIEF SUMMARY OF THE INVENTION

This invention is a method and system that uses controllable loads to perform power regulation. Certain controllable loads are faster responding, more capable of providing an accurate response, and therefore provide power regulation with more energy and economic efficiency. The invention comprises a system for dynamically managing an electrical power system that determines measures of performance and control criteria for the electric power system, collects at least one automatic generation control (AGC) input parameter to at least one AGC module and at least one automatic load control (ALC) input parameter to at least one ALC module, calculates AGC control signals and loads as resources (LAR) control signals in response to said measures of performance and control criteria, propagates AGC control signals to power generating units in response to control logic in AGC modules, and propagates LAR control signals to at least one LAR in response to control logic in ALC modules.

DETAILED DESCRIPTION OF THE INVENTION

Figure 1:
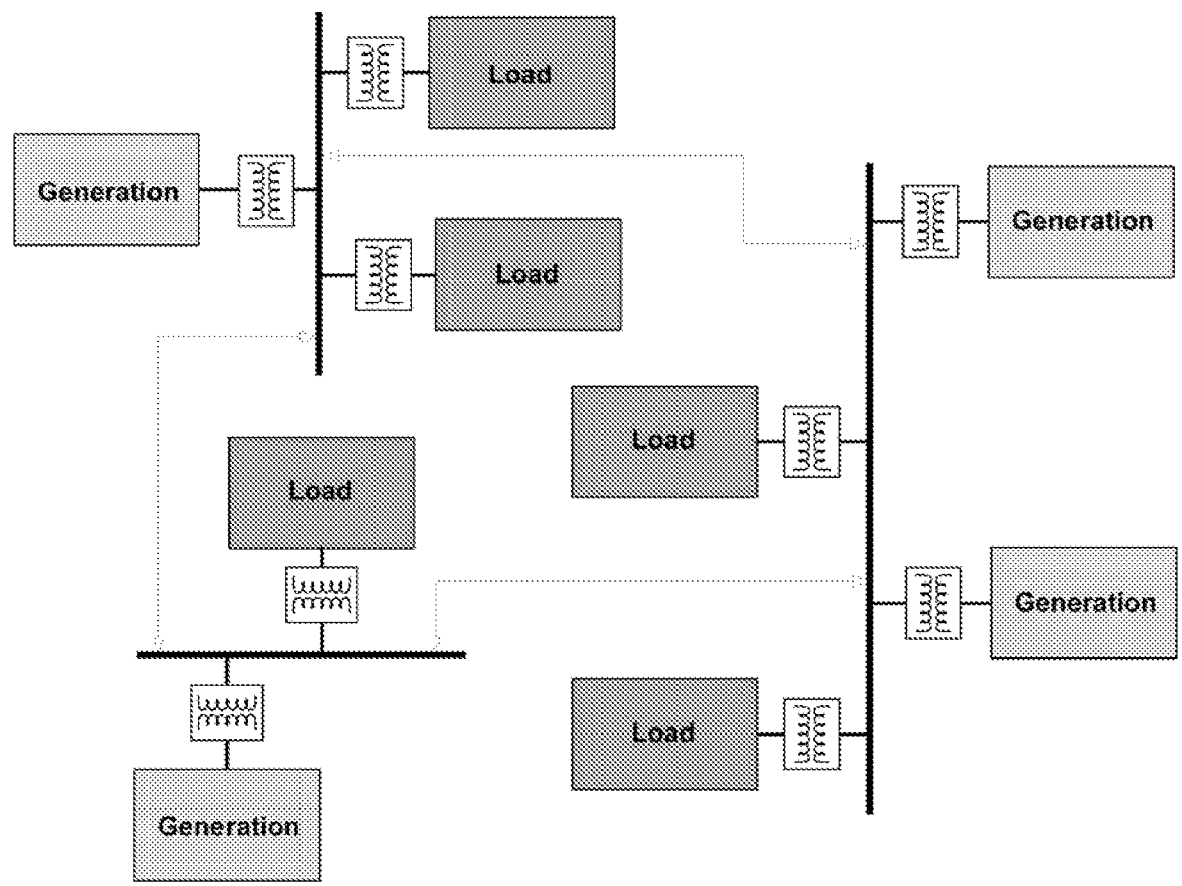
FIG. 1 is a schematic of an electric power grid structure.

This invention teaches controlling responsive loads to provide power system balancing (regulation and spinning reserve) to the utility power grid. Analysis of actual power system data show that this problem costs the utility industry, the customer base and the nation $2 Billion/year and 0.1-0.4 Quads of energy/year. This methodology could eliminate these huge inefficiencies. Advantages of this invention are significant economic and energy savings. All utilities have the need for power regulation and spinning reserve. Thus anyone seeking to save millions of dollars and trillions of Btus of energy per year should be interested.

Utility power systems exist to provide the nation with stable and reliable energy. Providing energy to residential, commercial or industrial power consuming loads requires a myriad of resources including, power generators, transmission lines, distribution systems and monitoring equipment commonly referred to as SCADA. However, the essence of stable and reliable power is the continuous and instantaneous balance of power generation with power consuming loads. Some power consuming loads, such as industrial arc furnaces, present a highly varying load profile to the power grid and thus make it very challenging to achieve a continuous and instantaneous balance.

While it is the case that power systems have remained highly reliable, their stability and therefore their reliability is becoming an increasing challenge for power providers to maintain. The utility marketplace continues toward deregulation at the same time the number of large, highly varying industrial loads proliferates. Operating margins are squeezed due to load growth and competitive market forces, while generation resources age. All of these factors provide the impetus for new solutions to power system regulation and spinning reserve that do not require large capital outlay.

Recent analyses, conducted on utility control area data, indicate a national average of 1.5% of total power system on-line generation capacity is held in controllable generation to manage power system regulation. This responsive generation reserve totals as much as 13,000 MW or the equivalent of 13 nuclear power plants. Generation reserves utilized for regulation are manifest by reducing an operating unit output from maximum so that it can be adjusted upward or down to track load variations. This reduction leads to significantly decreased operational efficiency. Analyses also indicate $1-3 Billion/year of additional operational costs result from regulation activities.

By controlling responsive loads to provide power-grid balancing, significant economic and energy inefficiencies can be eliminated. A utility control area operator sends control signals to responsive loads that provide regulation or spinning reserve according to a dynamic schedule. These control signals may direct the responsive load to move power consumption incrementally or may direct the load to a specific power level and thus provide power system balancing. The hardware and control signal methodology is defined below; however, specific embodiments will be tailored to given processes that are not limiting to the invention. For example, specialized hardware control actuators, sensors, or operational models may be necessary for each participating load. The following is a detailed description of an approach for controlling loads as a resource and the context within which the methodology and corresponding system are integrated into the operation of the power system.

Figure 2:
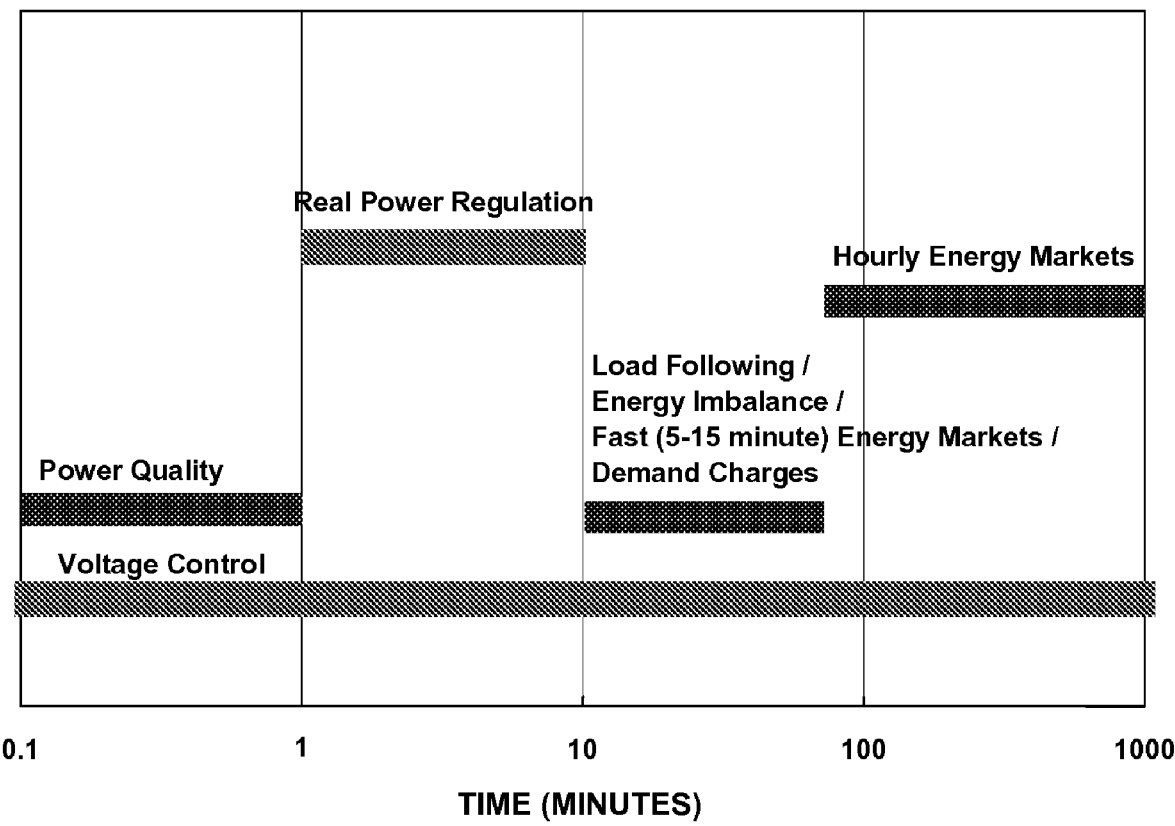
FIG. 2 is a graph of the time horizon for ancillary services.

The electric power utility network consists of generators and loads all of which are interconnected through transformers and circuit breakers as illustrated in FIG. 1. Transmission of power in North America is nominally at 60 Hz. The electrical power output of generators must equal the requirements of the loads they are serving. A mismatch of generation and load results in conditions that violate fundamental properties of the electric power being delivered for which strict triggers for emergency action include dropping of loads and generators. Voltage regulation, power quality, and protection systems are on a short time horizon, which amounts to cycle-by-cycle periods. These services are also conducted at the local level of power delivery. Hourly to daily supply of power is in the scope of load following and economic dispatch. Power regulation occupies the period between one and ten minutes as shown in FIG. 2. The average value of power regulation is zero because it swings positive and negative to balance generation and load within a control area.

A large portion of generation assigned to power regulation in a control area is there to support large highly varying loads. Power regulation control minimizes power flow over tie lines to other control areas. A large load coming online or a generator trip if not accommodated by generation within the control area will force power over the tie lines to achieve balance. These imbalances are monitored and subject to penalties according to several standards described below.

Control Performance Standard (CPS1)

CPS1 (in percent)=100*(2−(a Constant )*(frequency error)*(ACE))

$$AVG_{annual}\left\{\frac{ACE_i}{-10\beta}\Delta F_i\right\} \leq \varepsilon^2$$

where $ACE_i$ and $\Delta F_i$ are one-minute averages, and $\varepsilon$ is the one-minute average acceptable interconnection frequency error. The size of the constant changes over time for Control Areas with variable bias, but this effect can be ignored when considering minute to minute operation.

CPS1 is a statistical measure of Area Control Error (ACE) variability. It measures ACE in combination with an Interconnection's frequency error. CPS1 is intended to provide a Control Area with a frequency sensitive evaluation of how well the Control Area is meeting its demand requirements. Modern power grids integrate operation of many Control Areas (CA). Each CA's primary function is to balance the area's generation and load, and to control the flows on the interconnections with adjacent control areas. The ACE reflects this instantaneous balance. ACE is defined as the instantaneous difference between a Balancing Authority's net actual and scheduled interchange, taking into account the effects of frequency bias and correction for meter error.

Over a year, the average of the clock-minute averages of the Control Area's ACE divided by −10*β (β is Control Area Frequency Bias) times the corresponding clock-minute averages of the Interconnection's frequency error shall be less than a specific limit (a constant derived from a targeted frequency bound reviewed and set as necessary by the NERC Resources Subcommittee). See the NERC "Performance Standard Training Document."

Control Performance Standard (CPS2)

CPS2 (percent)=100*(periods without violations)/(all periods in the month)

$|ACE_{10} \leq L_{10}|$ where $ACE_{10}$ is a 10-minute average and $L_{10}$ is based on acceptable interconnection frequency error.

CPS2 is a statistical measure of ACE magnitude. It is designed to limit a Control Area's unscheduled power flows that could result from large ACE values. CPS2 is designed to limit the magnitude of ACE. Compliance is required $\geq 90$ percent of the time.

The average ACE for each of the six ten-minute periods during the hour (i.e., for the ten-minute periods ending at 10, 20, 30, 40, 50, and 60 minutes past the hour) must be within specific limits, referred to as L10. L10 is the bandwidth that ACE is bound to comply with CPS2.

Disturbance Control Standard (DCS)

ACE must return to zero (or to the pre-disturbance ACE value) within 10 minutes following a disturbance.

$ACE=(P_A-P_S)-10\beta(F_A-F_S)-0.3\beta(TimeError)$

Supplier Control Error (SCE)

The ACE and Net Interchange Deviation will be used as the Supplier Control Error for circumstances where system resources are used.

Supplier Recovery Error (SRE)

SRE=Actual Generation (MW)−Setpoint (MW), measured over the Disturbance Recovery Time Period. The Supplier Recovery Error must reach zero or positive MW prior to and continuing through the end of the Disturbance Recovery Period (DRP). The Supplier Recovery Error, in MW, will be recorded accurate to 1/10 MW. If the performance does not reach 100% plant compliance factor, then it will be counted as a failure to perform. The DRP is up to 15 minutes.

Regulation Compliance Criteria $StDev(SCE|_{hour})<\sigma$

CPS1 compliance criteria: 100% (based on one-minute averaging with four-second resolution)

CPS2 compliance criteria: 90% (based on one-minute averaging with four-second resolution)

DCS compliance criteria: ACE<80% of largest contingency (or 300 MW) (over 10-minutes)

Effects of Highly Varying Loads

Highly varying loads adversely affect the load/generation balance. Electric arc furnaces in particular create disturbances that effect power quality at the local level (e.g., flicker) as well as within the control area by way of large power swings that are difficult for generating stations to follow. Typical power consumption for an electric arc furnace is shown in FIG. 3.

Figure 3:
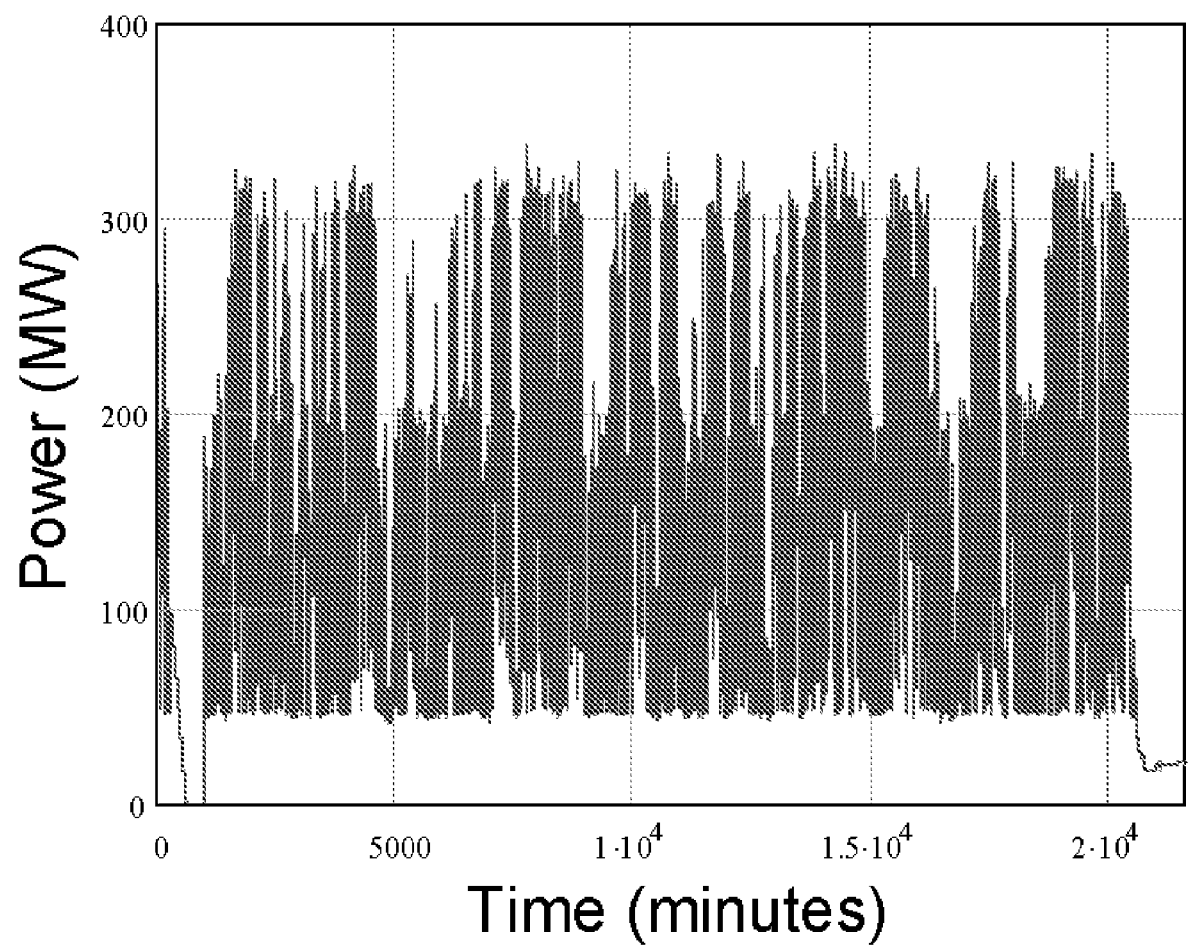
FIG. 3 is a graph of power consumption of an electric arc furnace over a two-week period.
Figure 4:
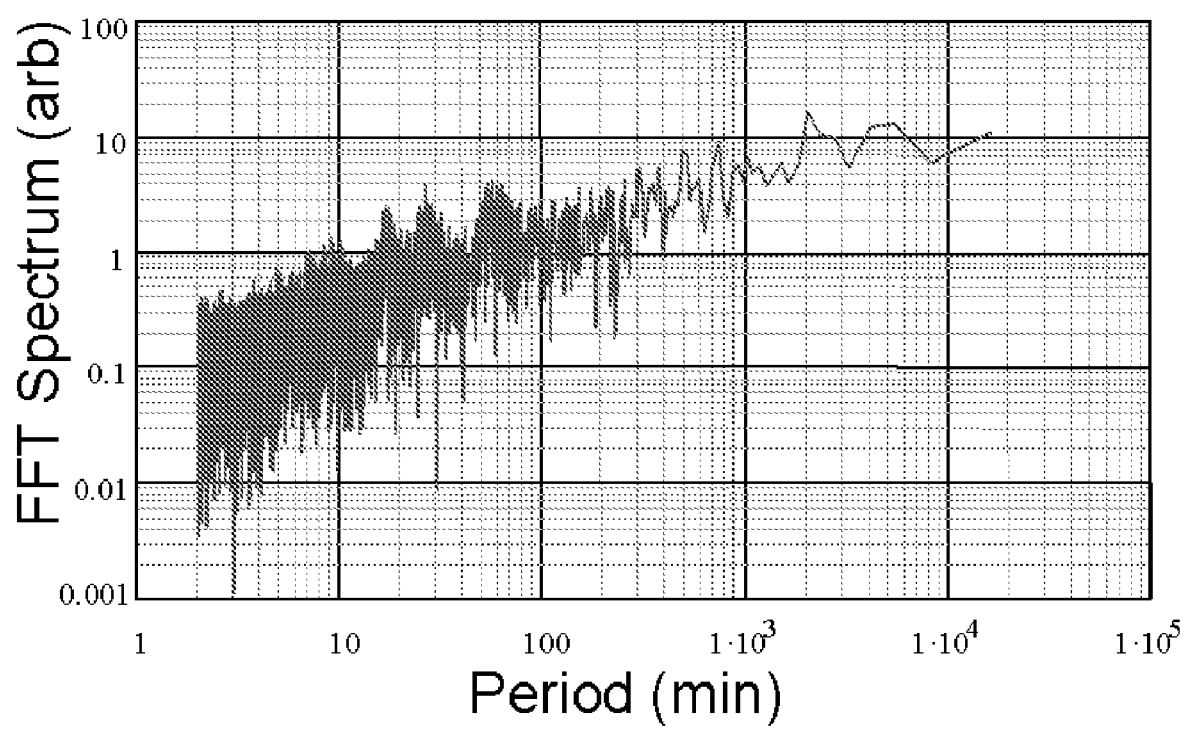
FIG. 4 is a graph of a frequency spectrum of an arc furnace.

A frequency plot of the signal in FIG. 3 is shown in FIG. 4. (The sampling period of once per minute limits the spectrum to two Hz and longer.) Energy in the ten-minute period is significant—at about a factor of ten less than that of the daily period. Some utilities dedicated half or more of their power regulation resources to the electric arc furnaces in their control area.

Use of Electric Loads (Customers) as a Resource to Perform Power Regulation

The use of electric loads as a short-term generation resource has several advantages. First, many loads have power control mechanisms and process thermodynamics that permit rapid changes between power consumption setpoints. Second, electrical (to chemical or thermal) efficiency of many processes are only mildly reduced by operating at a lower power level. In some cases, it is just a matter of reducing the number of process cells operating.

Actual power reduction (or increase) can be accomplished by mechanical transformer tap changes or phase angle change for electronic thyristor controlled systems. The mechanical tap changing has disadvantages because of the wear out of electrical contact surfaces. Tap-changing systems may need limits as to how often changes are made. Thyristor systems are capable of rapid, cycle-by-cycle changes since there are no moving parts.

Some processes have thermodynamic or chemical balance effects that compel slower changes otherwise the product quality may suffer, waste streams greatly increase, or plant equipment may be damaged. Even for these slow maneuvering loads, there are advantages: using the load as a short-term generation equivalent frees the utility to dispatch generation plants for full-power operation, which achieves their highest thermo-to-electric efficiency.

Using loads as a power balancing resource is possible because power regulation has an average power of zero. When a customer process is temporarily decreased for reduced power consumption, lost production must be recovered in a period suitable to both the customer and the needs of the control area. The characteristics and requirements of each load must be identified and considered before their utilization as load as resource (LAR).

Economic incentives will be required to engage customers to offer their processes as an externally controllable LAR.

Figure 5:
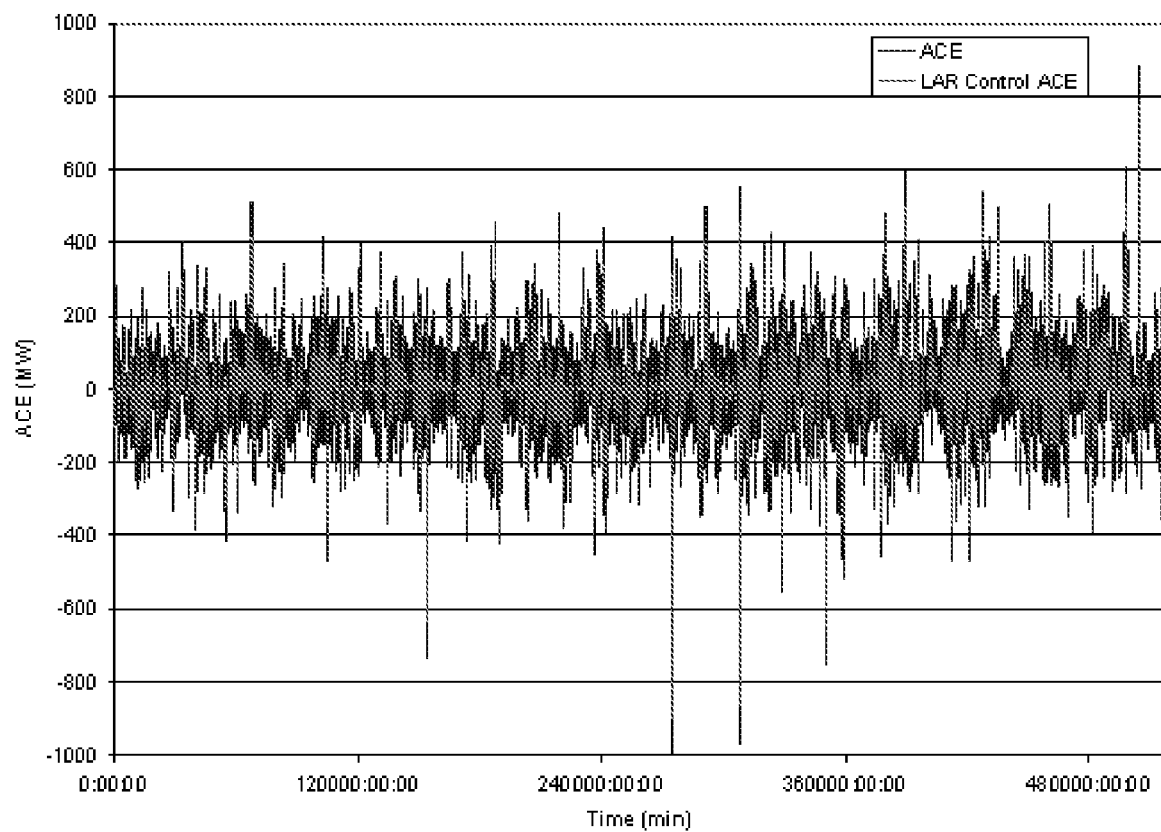
FIG. 5 is a graph of the ACE value lowered with combined LARs (shown with 100 MW LAR)

An example of applying a 100 MW LAR to a 30,000 MW control area is shown in FIG. 5 using real utility data. The ACE over a month is shown in blue. The red curve shows the lowered ACE because of the action of the LAR.

Structure of Measurement and Control Needed to Apply Loads as Power Regulation Resources

Time Horizons of AGC and ALC

Figure 6:
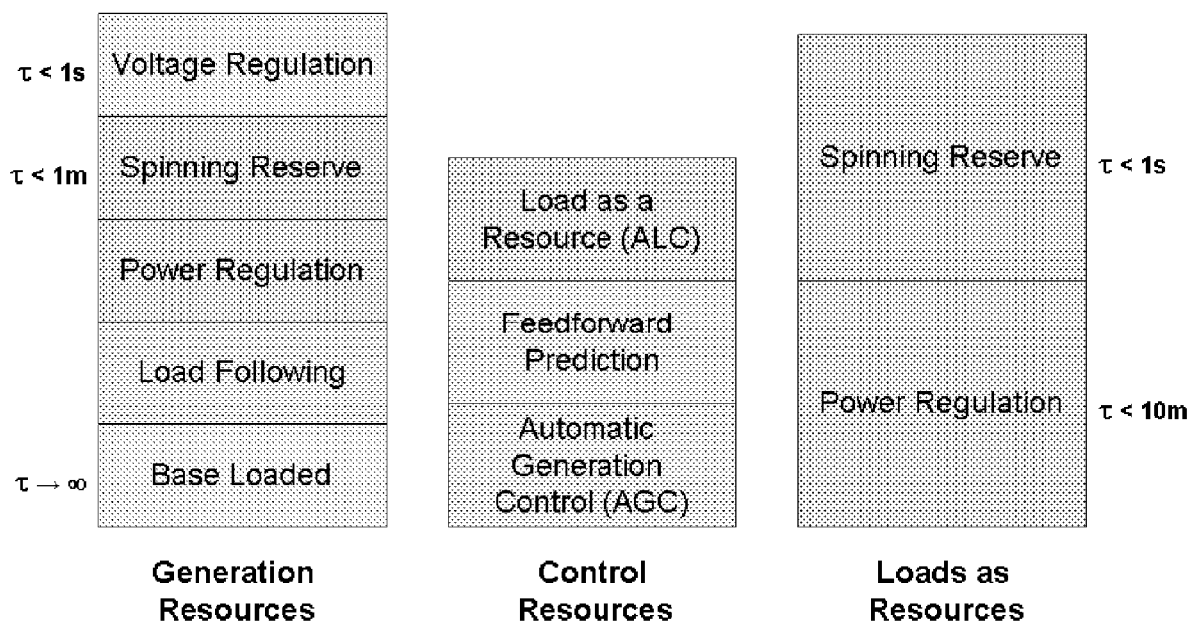
FIG. 6 shows the applicable time horizons for the major regimes of generation

A comparison of the time horizons involved with electric power generation is shown in FIG. 6. Voltage regulation, which has a period of less than one second, is a local service and not a part of AGC or ALC. Base loading is also outside the scope of AGC and ALC. Base-loaded plants are set at their maximum power output for long periods. Nuclear plants, for example, are base loaded. AGC controls generators allocated for load following, power regulation, and spinning reserve. Low-pass filters are applied to AGC signals to prevent asking generators to respond at unrealistic rates. As shown in the figure, feedforward prediction is sometimes used to improve the otherwise sluggish response of a fleet of generators. The figure also indicates the ALC system controlling LARs for power regulation and spinning reserve equivalent.

Automatic Generation Control

Automatic Generation Control (AGC) is a stand-alone control subsystem that regulates the power output of electric generators within a prescribed service area in response to changes in system frequency, tie-line loading, the relation of these to each other, and corrects accumulated time errors. AGC maintains the scheduled electric power system frequency and the established power interchange with other service areas within pre-established limits. AGC monitors and controls power generation with the following overall objectives:

a) Minimize area control error (ACE)
 b) Minimize operating costs (this works with economic dispatch and reserve monitoring
 c) Control pulsing and setpoint units
 d) Maintain generation at fixed (baseload) values
 e) Ramp generation in a linear fashion, according to schedule specified by operator
 f) Filter ACE signals to eliminate high-frequency deviations
 g) Apply rate-limiting logic
 h) Apply unit-not-responding logic
 i) Apply numerous filters, thresholds, and deadbands for tuning the AGC subsystem In normal operation, the AGC adjusts the power of the generating units automatically. This keeps the area's actual net interchange to the scheduled interchange and the actual frequency near the scheduled frequency.

The limitations of AGC is (1) the rate at which traditional generation plants can ramp to new power generation values and (2) the inefficiency incurred by operating power plants at less than full output to accommodate positive and negative power swings. These limitations can be overcome by augmenting the traditional AGC by allowing loads to behave as a balancing resource for short periods (one to ten minutes).

Adding Load as Resource (LAR) Control to AGC

The LAR concept permits fast acting changes in large or aggregations of smaller loads. Loads with tap-changing transformers can change value in less than one minute intervals; however, because of wear on the tap-changers, control movement restrictions would be required. Loads with solid-state (thyristor) control have cycle-by-cycle control capability with no penalty associated with control action other than consequences associated with modulating the plant production process under control.

Thermodynamic and chemical characteristics of processes must be accommodated. Even though electrical load changing might have rapid capability, some loads such as electrochemical reduction may have limits on rates of change and hold times. Nevertheless, many large loads have fast response capability compared with thermal generation plants.

Large electrical loads are consuming power, ultimately, for the production of raw materials or in some cases finished product. Therefore, when a load is called upon to reduce power demand for a period, an equal period must be permitted for later recovery of lost production. The status, ability to change power at a future time, and requirements for lost production recovery must be determined for each LAR. However, some LAR processes may choose to offer a unidirectional response (reduction from maximum power consumption) whereby a later return to maximum load appears as a beneficial regulation response to the power grid under future conditions.

Figure 7:
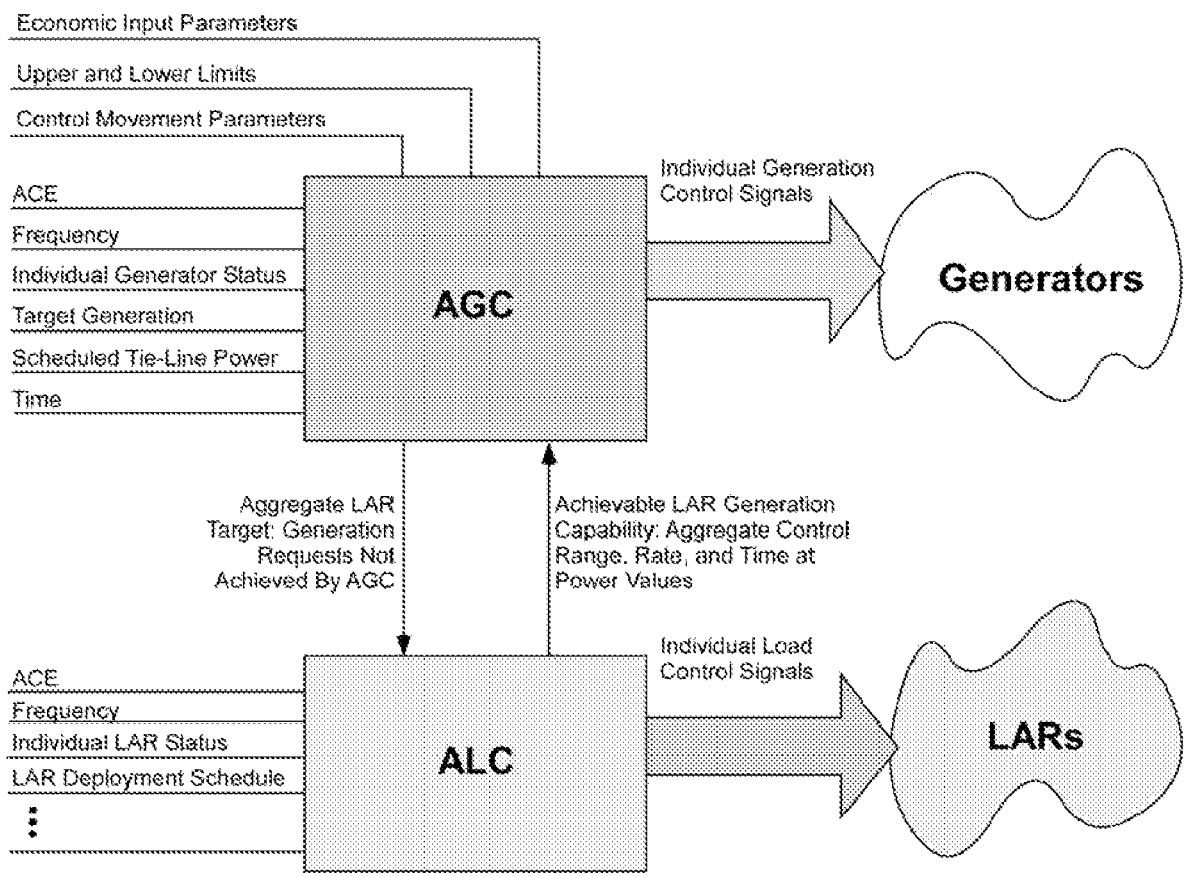
FIG. 7 is a diagram of a possible LAR control configuration.

LARs can be controlled in parallel with traditional electrical generation as shown in FIG. 7. The AGC system contains the traditional functionality for economic dispatch and generator governor control with inputs of ACE, frequency, generation targets, scheduled tie-line flows, and time correction. The AGC monitors the status of all generators in its scope of control and dispatches control signals accordingly to minimize movement, stay within limits, and maximize economic utilization.

The Automatic LAR control (ALC) operates primarily to minimize ACE but also accounts for scheduled tie-line flow and frequency correction. Other inputs are also possible which parallel those of the AGC. Status of the individual LARs helps economically dispatch LAR control actions.

The AGC and ALC communicate by exchanging information regarding availability of generators and LARs to respond to changes in power delivery. The AGC is the primary control system, which sends target values to the ALC.

Predictive control is used in varying amounts in the utility industry because, in part, the response of generation has been traditionally slower than loads in general. Therefore, less control error and better performance are possible if advance warning is available. A classic example is driving an automobile: the driver looks for some distance in front of the automobile and thus anticipates the need for apply power, brakes, steering, etc. If the driver were forced to look only immediately in front of the car and to the right shoulder (as in heavy fog), driving speed must be dropped, performance suffers, and the risk of accident increases.

ALC reduces the need for predictive estimation at least at the time horizon of power regulation (one to ten minutes) because of the fast response of LARs. Nevertheless, predictive control such as neural networks, fuzzy logic, and faster-than-real-time modeling may have further positive benefits in economically dispatching LARs for ACE minimization and power regulation.

Figure 8:
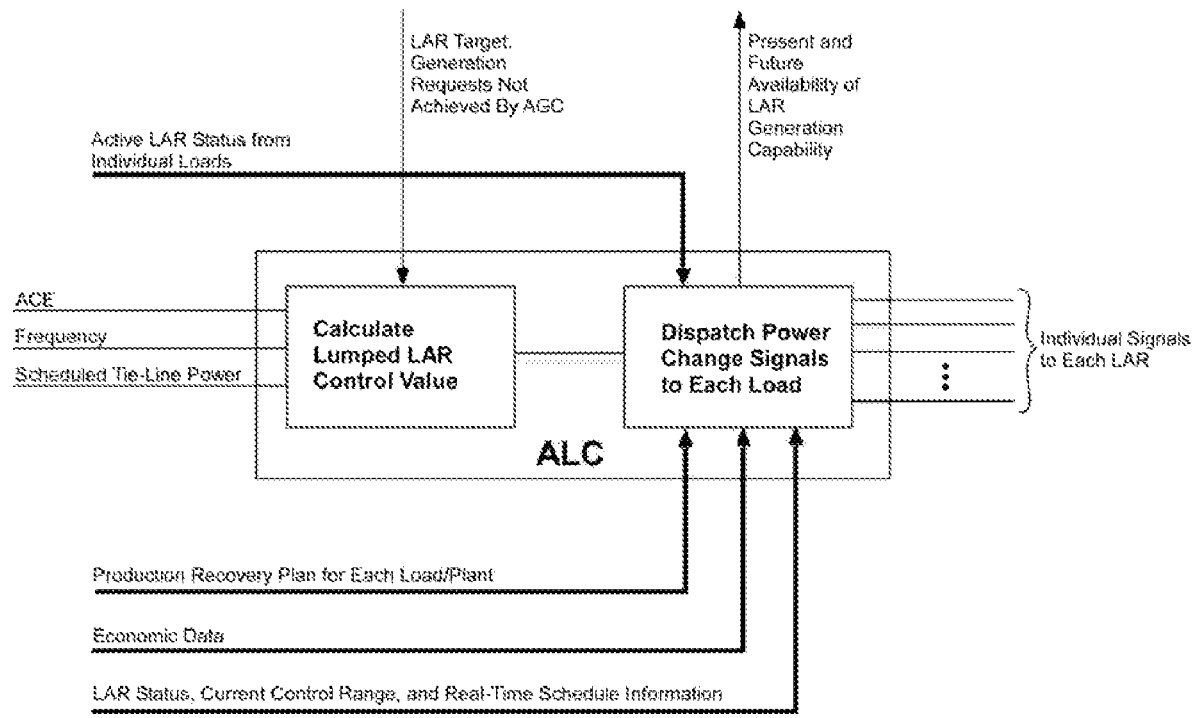
FIG. 8 is a diagram of ALC subsystems.

A deeper look shows two subsystems comprise the ALC as illustrated in FIG. 8. The inputs of ACE, frequency, and scheduled tie-line power along with target values given by the AGC system are used in the calculation of the (lumped) LAR power setpoint. This control value is passed to the subsystem that calculates the LAR distribution based on the state of each LAR, the ramp rates, the excursion limits, the maximum allowable departure time from normal, the lost production recovery plan, and current and anticipated market clearing prices for regulation services if necessary. The current capability and future achievable LAR equivalent generation is passed to the AGC and individual load signals are passed to the LARs.

In each of the ALC subsystems, several control methods can be employed individually or in concert such as fixed and dynamic threshold crossings, model-based control, and non-linear control.

Figure 9:
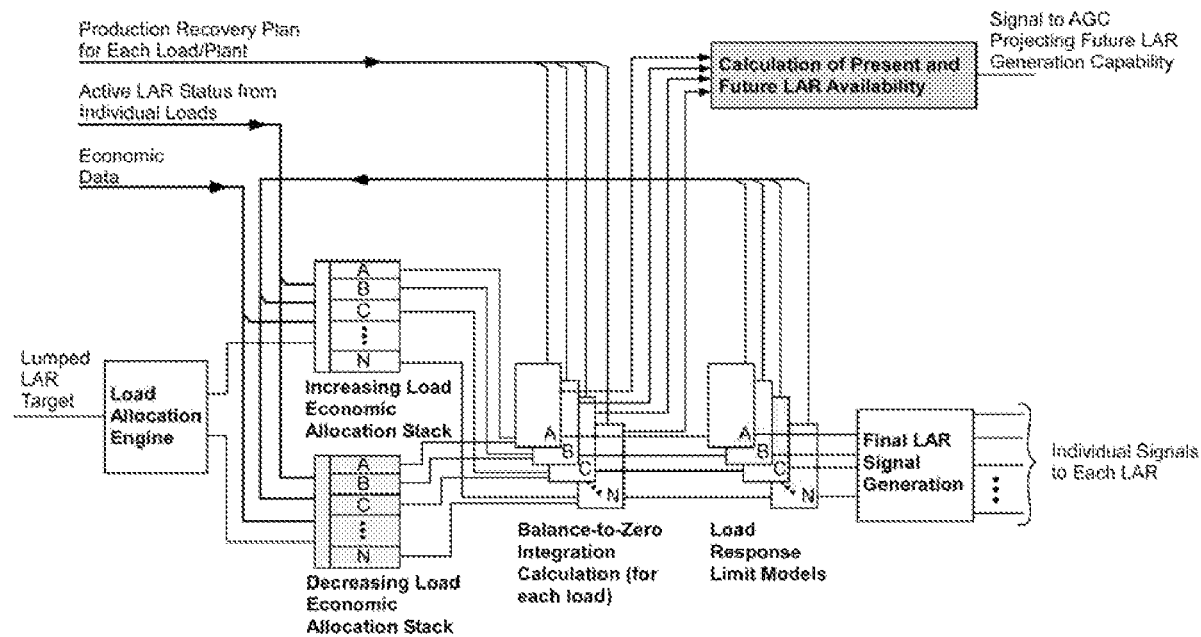
FIG. 9 is an example diagram of a LAR dispatch function module.

An example control methodology is shown for the next level of detail in the box of FIG. 8 named "Dispatch Power Change Signals to Each Load." FIG. 9 shows a system for dispatching the lumped LAR target generation to a fleet of LARs. One of the objectives of the subsystem of FIG. 9 is to control the energy delivery to each LAR over a balancing period so that customer production averaged over that period is not altered or is changed subject to an approved contract. In the figure, the lumped LAR target power value is processed by the Load Allocation Engine to produce positive and negative load values. (A positive value asks for increased load power utilization.) The Load allocation engine would have internal control dynamics for stability, load tracking, and responsiveness. The dynamic response may be non-symmetrical. Load rates decreasing and increasing in value may have unequal gain or response.

The positive and negative LAR values are delivered to two separate load allocation stacks. The load value is given to LARs according to priority in the stack, which is determined by economic calculations based on real-time economic data from the utility and load customer, the status of each of the LARs, and current performance of the LAR. Stacks for positive and negative load values are potentially different because of economics and response characteristics of the loads. Load values for each LAR in the system are passed to the Balance-to-Zero (BTZ) function module. Each load has a pre-established integration period over which the average power must return to a nominal value as determined by the customer's process characteristics. The BTZ function is separately applied to each load and is based on the production recovery plan established for each load. From the BTZ, signals are passed to a module that continuously predicts total LAR generation equivalent capability for the AGC. Also from the BTZ, load control signals are passed to the Load Response Limit module, which models the limitations of each LAR in the system. Maximum power swings and rates of change are monitored to prevent exceeding the limitations of LARS on an individual basis. The Load Response Module send signals back to the allocation stacks to change priority order based on these limitation margins. The final module prepares the load signals for each LAR in the system.

Figure 10:
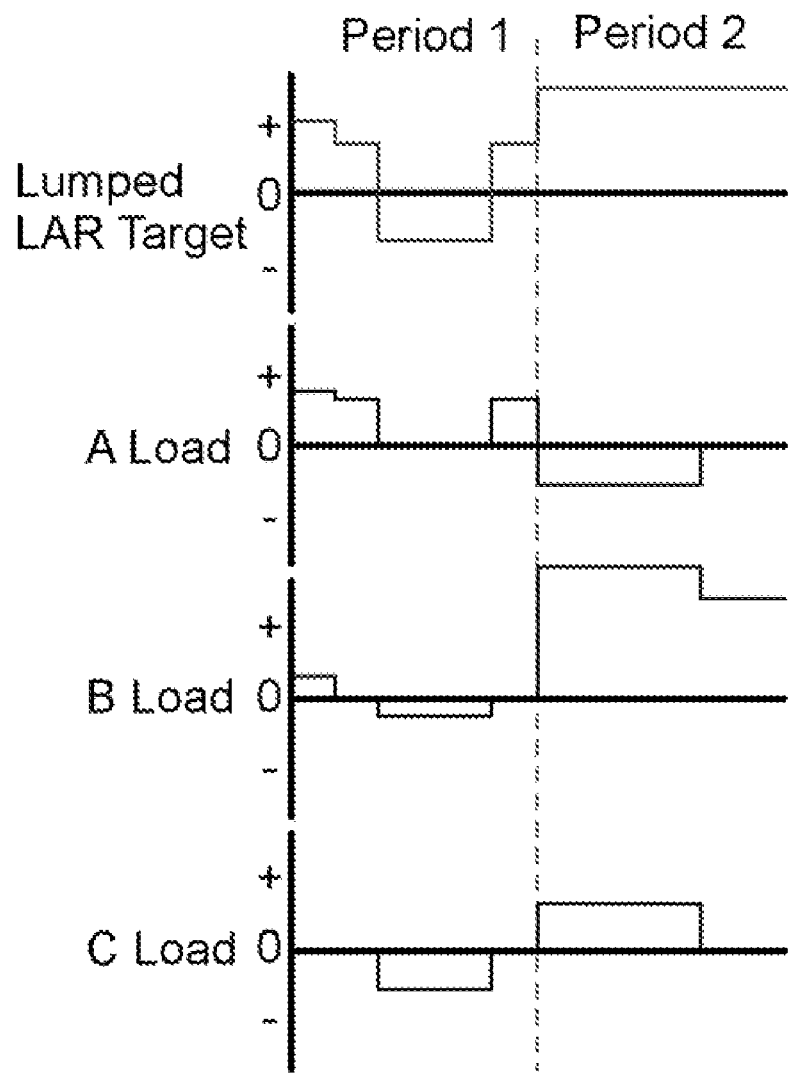
FIG. 10 is an illustration of allocation of LAR signals to three loads with balance to zero integration achieved in Load A over two periods.

A simplified example of the basic operation of the LAR dispatch function module is shown in FIG. 10. A LAR target value is shown evolving over two periods. Load A is the most economical to use for positive load values followed by B and C. Load C is the most economical for negative values followed by B then A. During the first period, load A takes up as much positive LAR value as it can handle with load B delivering the remainder. As LAR value decreases, B drops out with A supplying load. The LAR target swings negative and load C takes up the value to its limit with load B carrying the remainder. The LAR target returns to a positive value during the remainder period one; once again, load A is engaged. During the second period, the LAR target value further increases to the positive. However, the process characteristics of load A requires zero average power (over nominal) for the two periods. Therefore, load A is taken negative during period two to establish process balance. Load B increases to its limit to cover the LAR target value plus Load A. Load C shares the LAR target with B. Once load A has been balanced, B decreases and C drops off.

While there has been shown and described what are at present considered the preferred embodiments of the invention, it will be obvious to those skilled in the art that various changes and modifications can be made therein without departing from the scope.

We claim:

1. A method of dynamically managing an electrical power system, comprising the steps of:
   determining measures of performance and control criteria for the electrical power system;
   collecting at least one automatic generation control (AGC) input parameter to at least one AGC module and at least one automatic load control (ALC) input parameter to at least one ALC module;
   calculating AGC control signals and loads as resources (LAR) control signals in response to said measures of performance and control criteria;
   propagating AGC control signals to power generating units in response to control logic in AGC modules; and propagating LAR control signals to at least one LAR in response to control logic in ALC modules.

2. The method of claim 1 wherein said measures of performance is at least one measure selected from the group consisting of control performance standard OPS1, control performance standard CPS2, disturbance control standard (DOS), supplier control error (SOE), and supplier recovery error (SRE).

3. The method of claim 1 wherein said control criteria is at least one criteria selected from the group consisting of CPS1 compliance criteria, CPS2 compliance criteria, and DCS compliance criteria.

4. The method of claim 1 wherein said AGC input parameter is selected from the group consisting of economics, upper and lower limits, control movement, area control error (ACE), frequency, individual generator status, target generation, scheduled tie-line power, LAR target, and time.

5. The method of claim 1 wherein said ALC input parameter is at least one parameter selected from the group consisting of, area control error (ACE), frequency, individual LAR status, achievable LAR generation capability, scheduled tie-line power, and time.

6. The method of claim 1 wherein said ALC further comprises subsystems that use at least one control method selected from the group consisting of fixed and dynamic threshold crossings, model-based control, and non-linear control.

7. The method of claim 1 wherein said ALC further comprises at least one subsystem selected from the group consisting of load allocation stack, balance-to-zero integration, and load response limit.

8. A system for dynamically managing an electrical power system, comprising the steps of:
  determining measures of performance and control criteria for the electrical power system;
  collecting at least one automatic generation control (AGC) input parameter to at least one AGC module and at least one automatic load control (ALC) input parameter to at least one ALC module;
  calculating AGC control signals and loads as resources (LAR) control signals in response to said measures of performance and control criteria;
  propagating AGC control signals to power generating units in response to control logic in AGC modules; and
  propagating LAR control signals to LARs in response to control logic in ALC modules.

9. The system of claim 8 wherein said measures of performance is at least one measure selected from the group consisting of control performance standard CPS1, control performance standard CPS2, disturbance control standard (DCS), supplier control error (SCE), and supplier recovery error (SRE).

10. The system of claim 8 wherein said control criteria is at least one criteria selected from the group consisting of CPS1 compliance criteria, CPS2 compliance criteria, and DCS compliance criteria.

11. The system of claim 8 wherein said AGC input parameter is selected from the group consisting of economics, upper and lower limits, control movement, area control error (ACE), frequency, individual generator status, target generation, scheduled tie-line power, LAR target, and time.

12. The system of claim 8 wherein said ALC input parameter is at least one parameter selected from the group consisting of, area control error (ACE), frequency, individual LAR stats, achievable LAR generation capability, scheduled tie-line power, and time.

13. The system of claim 8 wherein said ALC further comprises subsystems that use at least one control method selected from the group consisting of fixed and dynamic threshold crossings, model-based control, and non-linear control.

14. The system of claim 8 wherein said ALC further comprises at least one subsystem selected from the group consisting of load allocation stack, balance-to-zero integration, and load response limit.

* * * * *